UNITED STATES PATENT OFFICE.

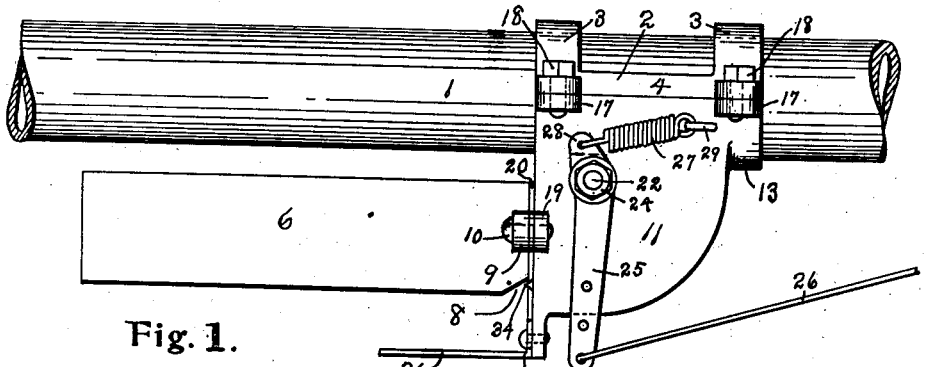
E. P. GRAY.
WHISTLE.
APPLICATION FILED DEC. 22, 1910.
1,024,683.
Patented Apr. 30, 1912.

EMMET P. GRAY, OF DETROIT, MICHIGAN.

WHISTLE.

1,024,683.

Specification of Letters Patent. Patented Apr. 30, 1912.

Application filed December 22, 1910. Serial No. 598,719.

*To all whom it may concern:*

Be it known that I, EMMET P. GRAY, a citizen of the United States, and residing at Detroit, in the county of Wayne and State of Michigan, have invented a new and useful Whistle, of which the following is a specification.

This invention relates to whistles particularly adapted for vehicles and its object is to provide a device which may be secured to the side of any pipe carrying steam, air or gases under pressure, which shall have a musical note, the loudness of which is under full control, and which is adapted to keep its exit openings clean.

In the accompanying drawings, Figure 1 is an elevation and Fig. 2 a bottom view of this improved whistle. Fig. 3 is a section on the line 3—3 of Fig. 2. Fig. 4 is a section on the line 4—4 of Fig. 3. Fig. 5 is a bottom view of a modified form of the construction.

Similar reference characters refer to like parts throughout the several views.

While the whistle is shown in the drawings attached to the lower side of a horizontal pipe 1, it should be understood that the device will operate in any position secured to a pipe extending at any angle. Air, steam and gases under pressure will operate the whistle, which is especially adapted to be secured to the exhaust pipe of explosion engines. The whistle is preferably secured between the engine and muffler, and one of its most advantageous features is, that it can be mounted on launches and automobiles already constructed without removing any of the parts. To do this, the yoke 2 may be laid against the pipe and the pipe scratched along the inner edges of the straps 3 and side-bars 4 of the yoke, and the indicated piece of pipe sawed out to form the opening 5, as shown in Figs. 3 and 4.

The whistle comprises a resonant shell, a body, a yoke, a valve and its shaft and an operating lever. The resonant shell may be formed of any desired number of tubes 6 and 7, preferably of different lengths, of any desired cross section, each tube provided with an opening 8. Lugs 9 on the resonant shell and screws 10 secure the same to the body. The body has sides 11, the edges of which fit the pipe 1, a curved outer face 12 provided with a curved lip 13 to fit the pipe 1, a flange 14 to support the adjustable plate 15, and a cross plate 16 which has its outer edge curved to fit the pipe. The body has lugs 17, screw-threaded for the screws 18 which secure the body and yoke 2 securely and tightly to the pipe. Any desired precautions to prevent leakage may be taken. The lugs 19 on the body receive the screws 10, which position the plate 20 lying between the body and the open ends of the tubes 6 and 7.

Revoluble in the body is a shaft 22 having a toothed washer 23 secured to it. On the end of the shaft, secured thereto by a nut 24, is a lever 25, having a toothed hub to engage the washer 23. See Fig. 2. A connecting rod or line 26 permits the lever to be operated from a distance. A spring 27 connected to the arm 28 and to the lug 29, normally holds the valve in closing position. On the shaft 22 is secured a double valve, a gate portion 31 extending normally across the opening into the body of the whistle. The other portion consists of an arm 32 and a cross-bar 33, having a sharp edge 34 which normally closes the opening between the plates 15 and 20.

Under normal conditions, the air, steam or gas will pass through the pipe 1 without affecting the whistle, the passage between the sides 11, plate 15 and plate 20 being closed by a valve formed by the sharp-edge 34 of the cross-bar 33, thus preventing escape of the fluid. When the pressure in the pipe 1 is large, the gate 31 will be unnecessary, for pulling the edge 34 out of its seat permits the fluid to rush out through the opening left thereby, causing the whistle to sound a note. But where the pressure is low and the escape of the fluid from the left end (in the drawings) of the pipe 1 is free, means must be provided to force the fluid to pass into the body. The gate 31 can be swung out into the pipe 1 through the opening 5, more or less obstructing the flow of the fluid through the pipe, and causing a greater or less amount to flow through the gap between the plates 15 and 20 thus governing the loudness of the sound. The gate 31 may even be swung at right angles to the pipe 1, as shown in dotted lines in Figs. 3 and 4, compelling practically all the fluid to pass into the body.

For small vehicles and launches, a single tube 40 may be employed as shown in Fig. 5, all the other parts being reduced in size.

If desired, the plate 15 may be provided with an extension 36 as shown in Fig. 1, to prevent dirt thrown up by the wheels of the automobile from lodging in the openings 8.

Many other changes may be made in the details of construction, within the scope of the claims, without departing from the spirit of my invention.

Having now explained my construction, what I claim as my invention and desire to secure by Letters Patent is:—

1. In a whistle, the combination with a pipe having an opening in its side, of a hollow body portion secured to said pipe over said opening and having a side which is at substantially right angles to the pipe said side having a slot, a revoluble shaft in said body, an arm on said shaft, a valve on the end of the arm within the body, means to normally hold the valve to close said slot, means to move said valve from said slot, and a tube mounted on said body adjacent said slot and formed with an opening to permit the fluid passing from said slot to so affect the tube as to produce a musical note.

2. In a whistle, the combination with a pipe having an opening in its side, of a hollow body portion secured to said pipe over said opening, a tube secured to said body and having a wall cut partially away next the body portion which is provided with an aperture near said wall where it is cut away, a valve to open and close the aperture in the body, and a gate connected to said valve and mounted to swing out into the pipe through the opening therein.

3. In a whistle, the combination of a hollow body having an inlet opening and a flat side having a slot, a shaft revolubly mounted within the body, an arm connected to said shaft, a wedge-shaped valve mounted on the arm and adapted to close said slot, a resonant shell mounted on the body adjacent said slot and having an aperture adjacent thereto, and means to turn said shaft to swing the valve out of said slot.

4. In a whistle, the combination of a hollow body having an inlet opening and an outlet slot, a valve normally closing said slot, a resonant shell mounted on the body adjacent said slot and having an aperture adjacent thereto, means to move the valve out of the slot, and a shield extending from the body parallel to the resonant shell to screen the opening thereof.

5. In a whistle, the combination of a hollow body having an inlet opening and an outlet slot, a pivotally mounted valve normally closing said slot, a resonant shell mounted on the body adjacent said slot and having an aperture adjacent thereto, a gate connected to said valve and normally extending across the inlet opening, and means to swing the valve inwardly to open said outlet slot, and the gate outward from the inlet opening.

6. In a whistle, the combination of a pipe to convey fluids under pressure, a hollow body secured thereto and having an inlet opening and an outlet opening with parallel sides communicating with the outer air, a wedge-shaped valve normally closing said outlet opening, a resonant bell mounted adjacent said body and having an aperture adjacent said slot, a lever to move said valve out of said outlet opening, and means connected to said lever to induce the fluids to enter said hollow body through said inlet opening.

7. In a whistle, the combination with a pipe having an opening in its side, of a hollow body portion secured to said pipe over said opening, a resonant shell secured to said body comprising a plurality of parallel tubes of unequal length having their outer ends closed and having a wall cut partially away to provide apertures next the body portion which is provided with an aperture near said wall where it is cut away, a valve to open and close the aperture in the body, and a gate connected to said valve and mounted to swing out into the pipe through the opening therein.

8. In a whistle, the combination of a body adapted to be connected to a pipe and having a slot communicating with the outer air, a valve normally entering and closing said slot, a resonant bell mounted on said body and provided with an aperture adjacent said slot, a gate connected to said valve, and means to swing said valve out of the slot and said gate into the path of the fluid passing through said pipe to cause the fluid to pass through said slot and sound the whistle.

In testimony whereof I have signed this specification in the presence of two subscribing witnesses.

EMMET P. GRAY.

Witnesses:
  EDWARD N. PAGELSEN,
  ELIZABETH M. BROWN.